United States Patent
Anders et al.

(10) Patent No.: US 11,100,294 B2
(45) Date of Patent: Aug. 24, 2021

(54) ENCOURAGING CONSTRUCTIVE SOCIAL MEDIA INTERACTIONS

(71) Applicant: International Business Machines Corporation, Armonk, NY (US)

(72) Inventors: Kelley Anders, East New Market, MD (US); Jeremy R. Fox, Georgetown, TX (US); Jonathan Dunne, County Waterford (IE); Liam S. Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 16/114,077

(22) Filed: Aug. 27, 2018

(65) Prior Publication Data

US 2020/0065375 A1 Feb. 27, 2020

(51) Int. Cl.
*G06F 40/35* (2020.01)
*G06F 17/18* (2006.01)
*G06F 16/9535* (2019.01)
*G06F 40/30* (2020.01)
*H04L 12/58* (2006.01)
*G06Q 50/00* (2012.01)

(52) U.S. Cl.
CPC .......... *G06F 40/35* (2020.01); *G06F 16/9535* (2019.01); *G06F 17/18* (2013.01); *G06F 40/30* (2020.01); *H04L 51/16* (2013.01); *G06Q 50/01* (2013.01)

(58) Field of Classification Search
CPC .................................. H04L 51/02; G06F 40/35
See application file for complete search history.

(56) References Cited

U.S. PATENT DOCUMENTS

| | | | |
|---|---|---|---|
| 7,421,429 B2 | 9/2008 | Thota | |
| 7,962,555 B2 | 6/2011 | Sastry et al. | |
| 8,676,875 B1 * | 3/2014 | Smith | G06Q 50/01 |
| | | | 709/200 |
| 9,292,877 B2 | 3/2016 | Blanchflower et al. | |
| 9,380,009 B2 * | 6/2016 | Ravi | H04L 51/02 |
| 9,384,189 B2 * | 7/2016 | Lee | G06F 16/3346 |
| 9,514,226 B2 | 12/2016 | Sandulescu et al. | |
| 10,304,036 B2 * | 5/2019 | Chandrasekaran | G06Q 10/10 |
| 2010/0042910 A1 * | 2/2010 | Manolescu | G06F 16/9535 |
| | | | 715/202 |
| 2013/0297581 A1 * | 11/2013 | Ghosh | G06F 16/313 |
| | | | 707/706 |
| 2014/0088944 A1 * | 3/2014 | Natarajan | G06Q 30/02 |
| | | | 703/13 |
| 2014/0344359 A1 | 11/2014 | Broz et al. | |
| 2014/0359022 A1 * | 12/2014 | Buddenbaum | G06F 40/169 |
| | | | 709/206 |

(Continued)

*Primary Examiner* — Shaun Roberts
(74) *Attorney, Agent, or Firm* — Garg Law Firm, PLLC; Rakesh Garg; Michael O'Keefe

(57) ABSTRACT

Based on analyzing social media content, a model is constructed representing development of a first user's posts and interactions with other users over time. Using the model, a likelihood is computed that a post of the first user represents constructive dialogue. Using the model, the likelihood, and the post, a trajectory of future posts is forecasted. Responsive to forecasting a negative trajectory, a remedial action to positively alter the trajectory is applied.

15 Claims, 4 Drawing Sheets

(56) References Cited

U.S. PATENT DOCUMENTS

| | | | |
|---|---|---|---|
| 2015/0067052 A1* | 3/2015 | Bounds | H04L 51/12 709/204 |
| 2015/0172145 A1* | 6/2015 | Skiba | H04W 4/21 709/224 |
| 2016/0043913 A1* | 2/2016 | Mukherjee | H04L 67/22 707/709 |
| 2016/0196561 A1* | 7/2016 | Iyer | G06Q 30/016 705/304 |
| 2017/0103066 A1 | 4/2017 | Kisin et al. | |

* cited by examiner

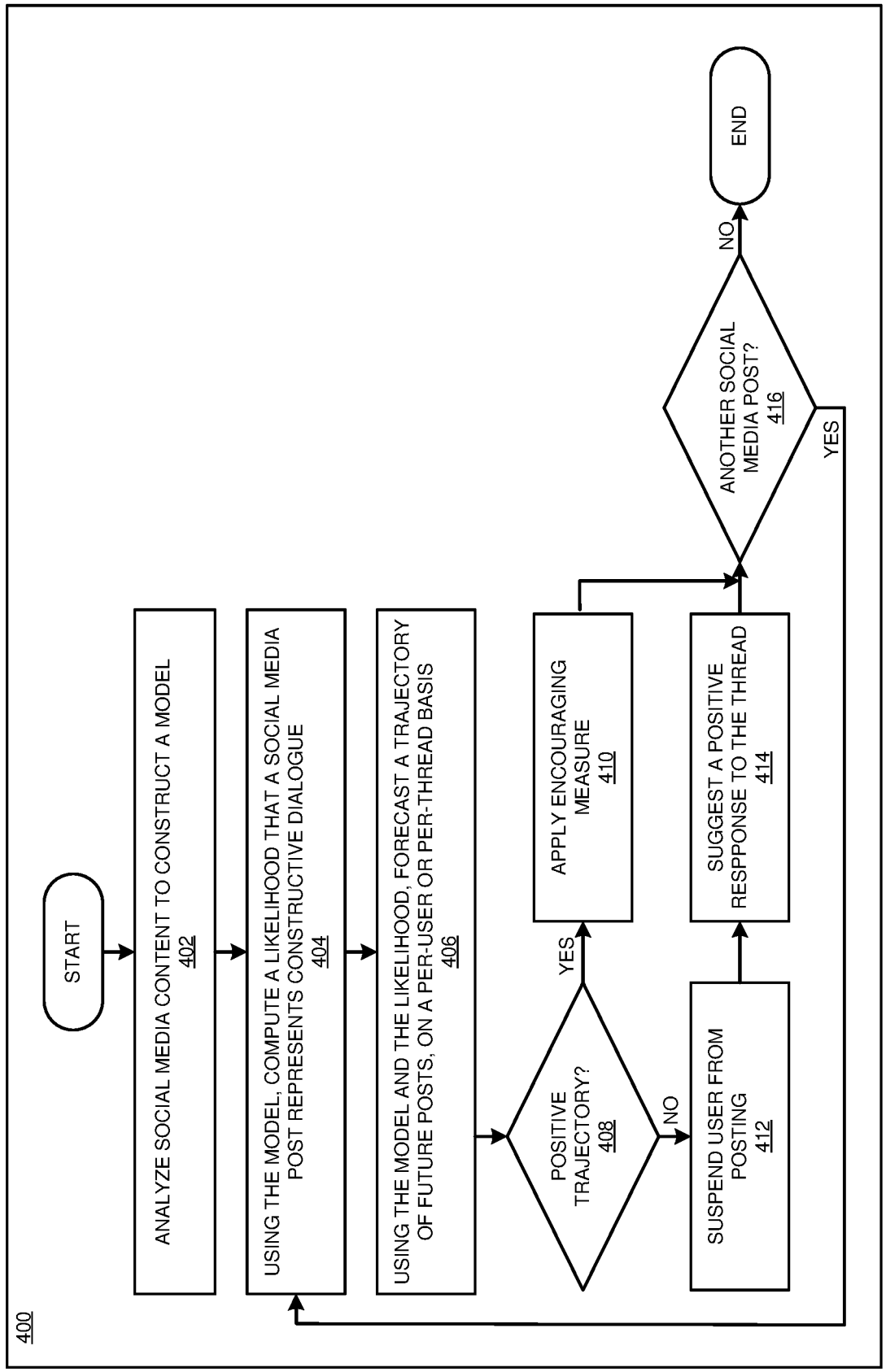

ENCOURAGING CONSTRUCTIVE SOCIAL MEDIA INTERACTIONS

TECHNICAL FIELD

The present invention relates generally to a method, system, and computer program product for social media interaction. More particularly, the present invention relates to a method, system, and computer program product for encouraging constructive social media interactions.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional sharing of content, bi-directional messages, or broadcast communications in a variety of languages and forms. Such communications in the social media are commonly referred to as "posts". The contents of posts can include natural language conversation, images, multimedia, and/or links or references, any of which can be in proprietary conversational styles, slangs or acronyms, urban phrases in a given context, formalized writing or publication, and other structured or unstructured data. Posts are often organized into related interactions, referred to as "threads", in which one user posts, then others react to the first post with posts of their own.

Users increasingly interact with each other through email, messaging, social media, and other networked communication tools. As such interactions become more ubiquitous, the quality of those interactions also becomes more important. Positive experiences during social interactions encourage users to continue to increase the usage of a social media platform, increasing the value of the platform to users, advertisers, and those who operate the platform. Conversely, negative experiences during social interactions encourage users to leave a social media platform or reduce the usage of the platform.

SUMMARY

The illustrative embodiments provide a method, system, and computer program product. An embodiment includes a method that constructs, based on analyzing social media content, a model representing development of a first user's posts and interactions with other users over time. The embodiment computes, using the model, a likelihood that a post of the first user represents constructive dialogue. The embodiment forecasts, using the model, the likelihood, and the post, a trajectory of future posts. The embodiment applies, responsive to forecasting a negative trajectory, a remedial action to positively alter the trajectory.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a flowchart of an example process for encouraging constructive social media interactions in accordance with an illustrative embodiment.

DETAILED DESCRIPTION

Figure 1:
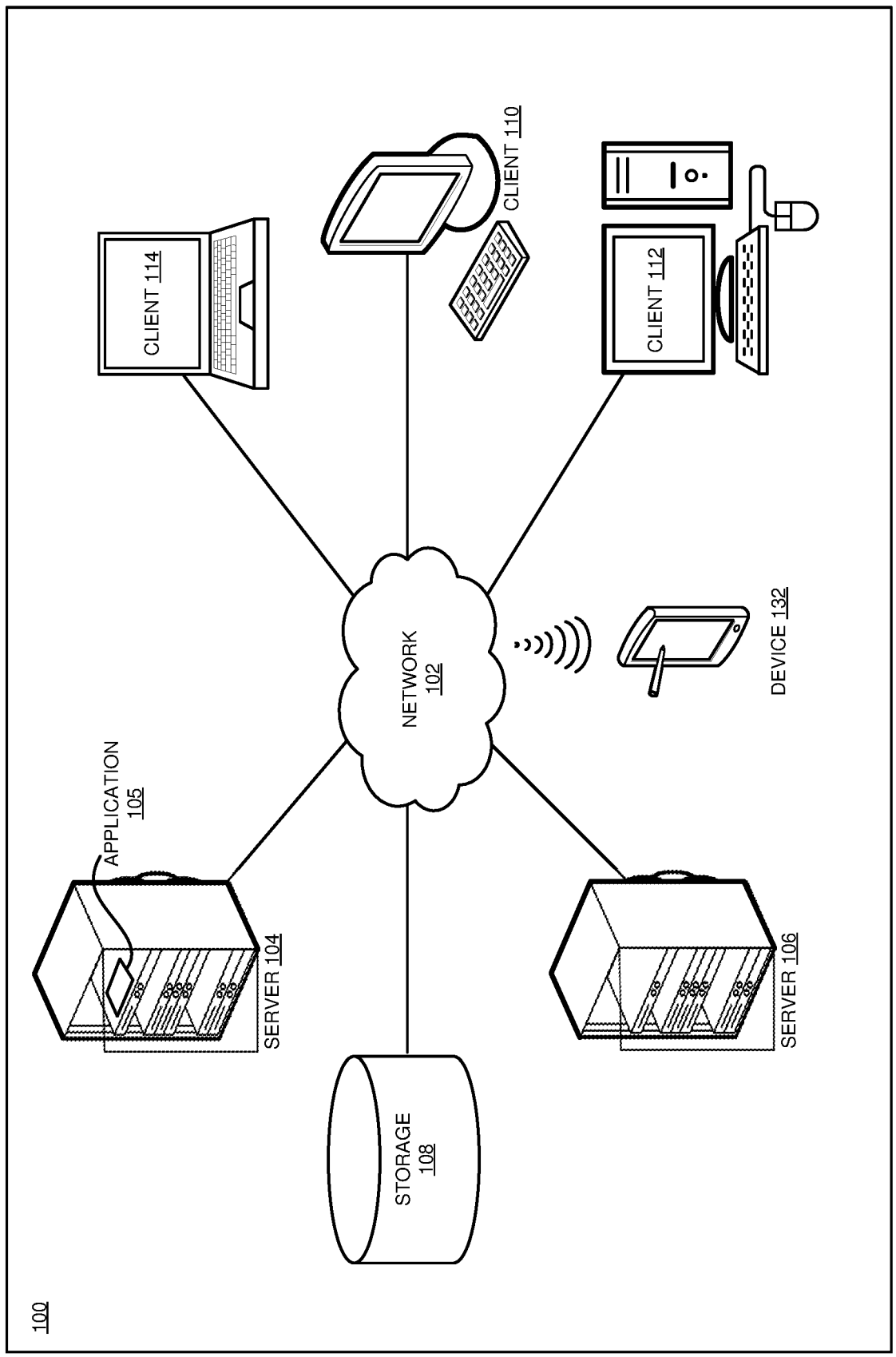
FIG. 1 depicts a block diagram of a network of data processing systems in which illustrative embodiments may be implemented.

Constructive interactions—as used herein, on-topic information exchanges that are useful to the participants—encourage users to associate an increased personal value or usefulness with a platform. Such users use the platform more frequently and regularly, try new aspects of the platform, and recommend the platform to others. Conversely, interactions that are not constructive—off-topic exchanges, abuse, name-calling, personal attacks, and similar behavior—encourage users to associate a decreased personal value or usefulness with a platform. Such users may engage in negative behaviors of their own, avoid areas of the platform, reduce their platform usage or leave altogether, and are unlikely to recommend the platform to others. As well, although when interacting with each other individuals conduct conservations and social discourse similarly to the way they would in person, nuance, sarcasm, context, non-verbal information, and other social cues are often missing from online interactions. As a result, small increases in behavior that is not constructive which go unchecked over time often grow, quickly making such interactions so unpleasant that users do not value a platform.

Interactions over social media often follow patterns. A user posts a question, then several others answer, and ask questions or make further comments of their own. A constructive thread stays on-topic and the participants exchange useful information in a polite manner appropriate to the thread and the participants. Often the participants work together to achieve consensus and solve a problem posed be the original post. Eventually the thread ends when no further posts are made on that topic.

A thread that is not constructive may start in the same manner, with a user posting a question and several others answering, but then veers off course. Often one user will post an answer that is not related to the topic at hand, but simply what this user wants to discuss. In return, other participants may turn to the new topic, or may attack the user for posting off-topic or rehashing settled matters. In any case the original topic is often abandoned with little or no information exchange, consensus building, or problem solving.

For example, consider one scenario. User A posts, "Hi Team. How can we get the xyz software to compile faster?" User B responds, "The network hardware should be upgraded." Then User C responds, "A network upgrade will give some performance improvement, but upgrading storage throughput will give us the biggest bang for the buck." And User D posts, "I keep telling you guys we should be using COBOL. You're all dumb." Here, User B and User C are providing helpful suggestions that move the dialogue towards solving User A's original question, but User D is rehashing an old, settled debate and attacking the other posters instead.

In addition to the lack of information exchange, consensus building, or problem solving, such unconstructive patterns can also alienate other users. For example, a more tentative user may wish to contribute to an interaction, but be reluctant to post for fear of being the target of off-topic attacks.

The illustrative embodiments recognize that it would be useful to abort such negative interactions early in the unconstructive pattern, before they worsen, and instead turn such interactions in a positive direction. However, using human moderators to monitor and control every interaction would require so many human moderators, given the volume of social media interactions, as to be completely unworkable. Thus the illustrative embodiments also recognize that reducing the number of interactions that must be policed by human moderators lowers costs for platform operators and improves moderation response times.

The illustrative embodiments recognize that the presently available tools or solutions do not address these needs or provide adequate solutions for these needs. The illustrative embodiments used to describe the invention generally address and solve the above-described problems and other problems related to encouraging constructive social media interactions in such a way that threads may largely police themselves without outside human intervention.

An embodiment can be implemented as a software application. The application implementing an embodiment can be configured as a modification of an existing social media system, as a separate application that operates in conjunction with an existing social media system, a standalone application, or some combination thereof.

Particularly, some illustrative embodiments provide a method for ascertaining the likely trajectory of a thread and, if appropriate, intervening to alter the trajectory by managing the participants in the thread.

An embodiment constructs a model representing development of social media users' posts and interactions with other user over time. In particular, an embodiment monitors users on a per-post or per-thread basis, or over multiple threads or topics. Monitoring can be done as a user makes individual posts, as a batch process looking back at archived content, or based on archived content and then refined as a user posts further.

An embodiment uses commercially-available Natural Language Understanding techniques to analyze semantic features of each post, including categories, concepts, emotion, entities referenced and relations between entities referenced, keywords, metadata associated with the post, semantic roles of entities and keywords, and sentiment of both the post as a whole and specific entities and keywords within the post. In particular, such techniques can determine a sentiment score for a post, reflecting how negative or positive a post is. Such techniques can also assign scores reflecting the degree to which a post conveys particular emotions such as sadness, joy, fear, disgust, and anger. For example, given a post, "IBM is a fantastic company to work for!!" such techniques might assign a sentiment score of 0.9 (reflecting very positive sentiment, on a scale from −1 denoting extremely negative sentiment to +1 denoting extremely positive sentiment), emotion scores of sadness=0, joy=0.9, fear=0, disgust=0, and anger=0 (all on a 0-1 scale), identifying IBM as an entity mentioned in the post and identifying "IBM", "company", and "work" as keywords.

Based on these analyses, an embodiment determines the topics of a user's posts, which posts the user is interacting with and the topics of those posts, as well as the sentiment, emotions, and other reactions present in the user's posts and the posts the user is interacting with. "Interacting with" as used herein means both the posts the user responds to and the posts others make responding to the user's posts. Topic determination is important, to identify threads and because a user may post constructively on some topics, and in some threads on a topic, and unconstructively on others.

Based on the results of the monitoring, an embodiment constructs a dataset of statistically significant words or phrases that correlate with a tone improvement in user interactions. To construct the dataset, an embodiment uses a historical class analysis, or any other suitable technique. As well, based on statistics reflecting the results of the monitoring, for every user and for all topics associated with that user, an embodiment computes a probability that that user is open to an interaction, either globally or on a per-topic basis. Here, a user who is open to an interaction is a user that will likely behave constructively. Conversely, a user who is not open to an interaction is a user that will likely not behave constructively, instead reposting old arguments, attacking others, and indulging in other similar behaviors.

Once an embodiment has analyzed sufficient content to enable predictions to be made, an embodiment monitors posts as they are made. An embodiment can be configured to monitor all posts, posts or threads on certain topics, or posts or threads users or administrators flag for monitoring. For example, in the example scenario described above, when User A posts, "Hi Team. How can we get the xyz software to compile faster?" and flags the thread for monitoring, an embodiment will monitor and analyze the resulting thread.

An embodiment analyzes each post in the monitored thread, determines relationships and tone differences among posts, and using the results of the previous analysis, computes a likelihood, above a predetermined threshold, that each post represents constructive dialogue. An embodiment also computes a likely trajectory of future posts in the thread, for each user participating in the thread and for the thread as a whole. For example, in the scenario described above, User B responds, "The network hardware should be upgraded." Then User C responds, "A network upgrade will give some performance improvement, but upgrading storage throughput will give us the biggest bang for the buck." Both posts represent useful responses to the original question, are on-topic, closely related in time to each other, and are not scored highly for negative emotions or negative sentiment. Consequently, an embodiment rates both posts highly for constructive dialogue, and determines that the thread is proceeding constructively and likely to continue in this manner for a particular time period. Here the embodiment might predict that, for this example, this thread will stay alive for at least another five hours because, although they have vastly different opinions about the topic, the thread shows that User A, User B, and User C are assimilating each other's opinions and moving towards a consensus. Further, if an embodiment determines that a thread is proceeding constructively, the embodiment, if configured to do so, notifies the thread originator, the positive contributors, and prospective contributors.

However, an embodiment may determine that a thread is not proceeding constructively. For example, in the scenario described above, User D brings up an old, settled debate and attacks the others by posting, "I keep telling you guys we should be using COBOL. You're all dumb." Here, scores for User D's response reflect higher scores for negative emotions and a more negative sentiment score. As well, User D is not interacting with the other users to move the dialogue towards consensus, User D's opinion is not changing over time, and User D's post includes personal attacks. Further, history suggests User D always suggests using COBOL, no matter what the actual question is. Thus the embodiment rates User D's post as having a lower likelihood, below the threshold, of representing constructive dialogue, and determines that the thread is at a turning point and may not continue to proceed constructively.

An embodiment continues to monitor and evaluate posts in this manner. In addition, for each thread being monitored, an embodiment determines whether the thread is still proceeding constructively. An embodiment makes such a determination using statistical keyword monitoring. If the thread remains constructive, an embodiment, if configured to do so, encourages further participation, by opening the thread to additional contributors, highlighting the thread, allowing the thread to remain open for posting for a longer period of time, or otherwise notifying users that this thread is particularly useful or constructive. An embodiment implements this configuration via a user interface, or by any other suitable method.

However, if the thread turns unconstructive, or has a trajectory indicating a likelihood of turning unconstructive, an embodiment, if configured to do so, takes one or more actions to attempt to remedy the situation. For example, if one user is the source of the unconstructive trajectory, one embodiment warns the user that his or her behavior is unacceptable, then if the behavior continues the embodiment suspends the user from posting in a thread for a period of time. If the behavior continues the embodiment suspends the user from posting to the thread for a longer period of time, or suspends the user from related threads for a time period. Ultimately if the behavior continues in one or many threads, the embodiment permanently bans the user from posting to related topics or from posting on the platform at all. In addition, if a sufficient fraction of the users posting to a thread s are contributing to the unconstructive trajectory, an embodiment prevents all users from posting to thread for a period of time. The embodiment may also permanently prevent all users from posting to thread if the behavior continues after a suspension expires. An embodiment also suggests skeleton responses to the thread that include words or phrases that are consistent with the tone trajectory of the thread or are likely to improve the tone trajectory of the thread. For example, a user who has posted in a negative tone and appears likely to continue in this manner could be provided with a skeleton response such as, "Your tone is quite negative. Here's a suggested rephrasing," and giving the user the option to accept or reject the suggested rephrasing. An embodiment also suggests a timing and a location for such skeleton responses.

An embodiment can also be configured to scan interactions triggers at a pre-defined interval, forecasting trends and generating remedial actions if the trends show such actions are likely to be necessary.

The manner of encouraging constructive social media interactions described herein is unavailable in the presently available methods. A method of an embodiment described herein, when implemented to execute on a device or data processing system, comprises substantial advancement of the functionality of that device or data processing system in recognizing and predicting unconstructive social media interactions and taking appropriate remedial action.

The illustrative embodiments are described with respect to certain types of contents, transmissions, delays, events, climactic events, non-climactic events, periods, forecasts, thresholds, validations, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
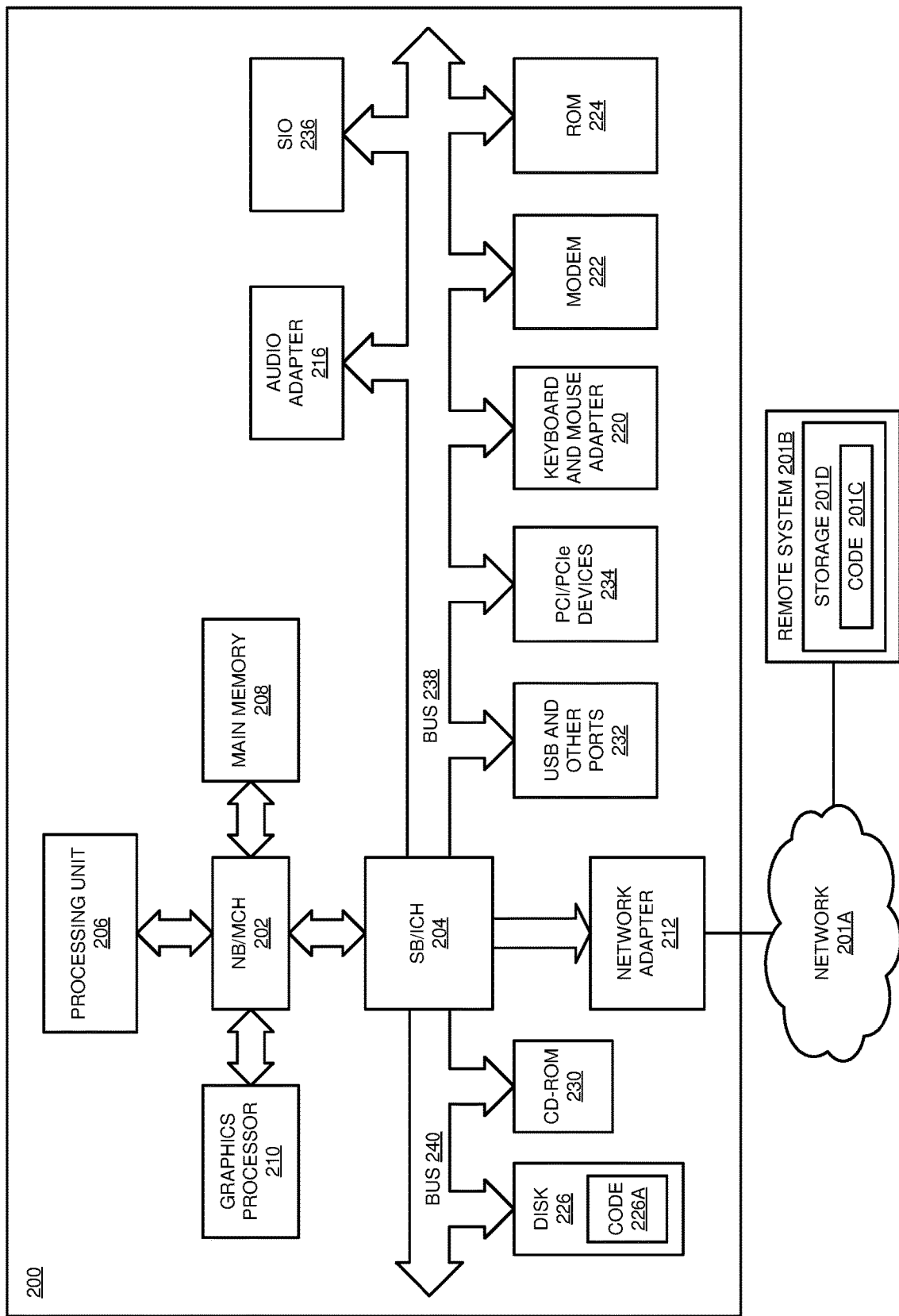
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. As an example, a user may make social media postings and interact with application 105 using device 132 or clients 110, 112, or 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
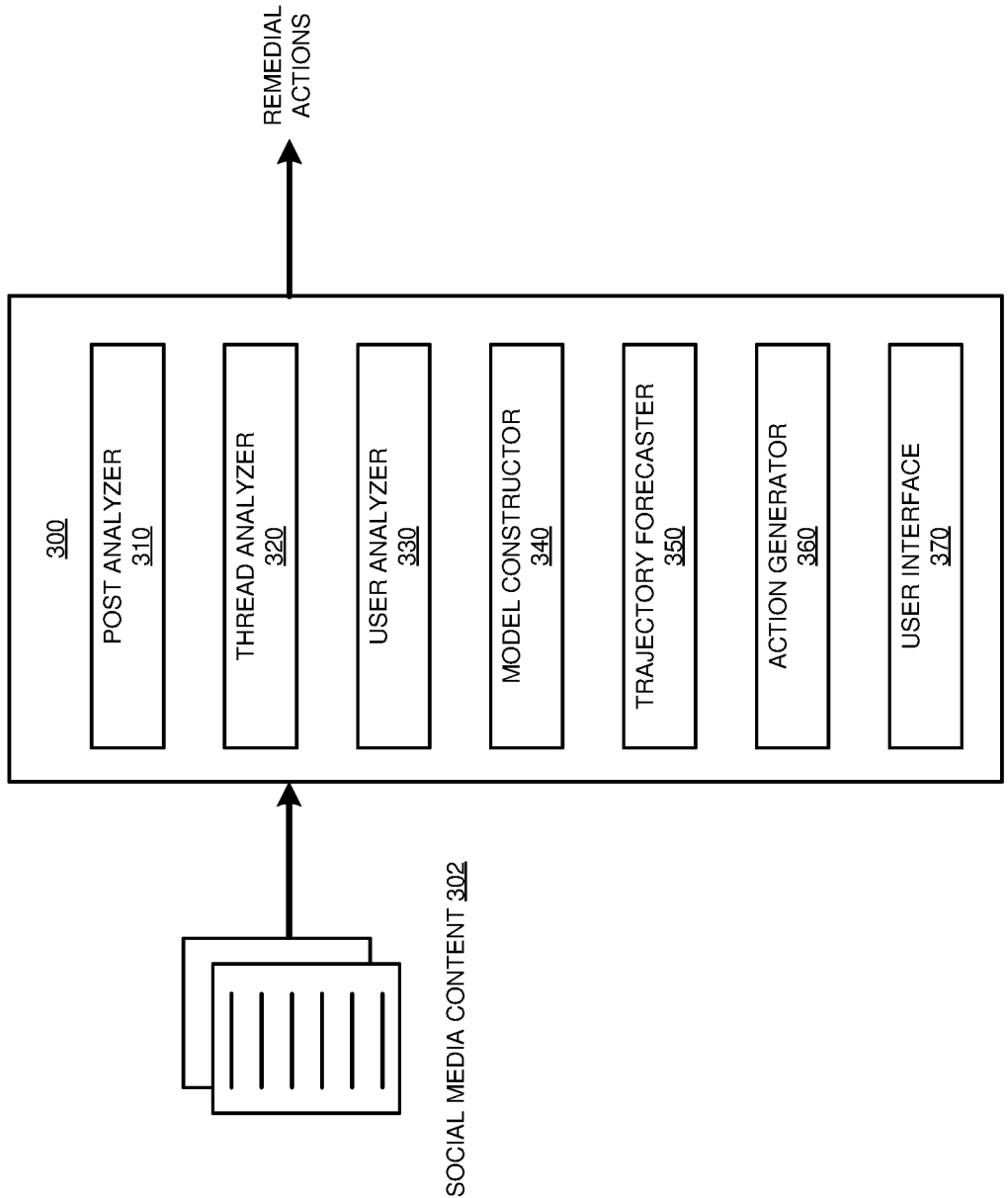
FIG. 3 depicts a block diagram of an example configuration for encouraging constructive social media interactions in accordance with an illustrative embodiment.

With reference to FIG. 3, this figure depicts a block diagram of an example configuration for encouraging constructive social media interactions in accordance with an illustrative embodiment. Application 300 is an example of application 105 in FIG. 1 and executes in server 104 in FIG. 1.

Social media content 302 feeds into application 300 from network 102 in FIG. 1, or any other suitable source. Application 300 includes post analyzer 310, which uses Natural Language Understanding techniques to analyze semantic features of each post within social media content 302, including categories, concepts, emotion, entities referenced and relations between entities referenced, keywords, metadata associated with the post, semantic roles of entities and keywords, and sentiment of both the post as a whole and specific entities and keywords within the post. Post analyzer 310 determine a sentiment score for a post, reflecting how negative or positive a post is, and assigns scores reflecting the degree to which a post conveys particular emotions such as sadness, joy, fear, disgust, and anger.

Based on the analyses of post analyzer 310, thread analyzer 320 determines the topics of a user's posts and the topics of the posts the user is interacting with, and groups posts into threads. Also based on the analyses of post analyzer 310 and thread analyzer 320, user analyzer 330 associates each user with posts, threads, and topics, and determines the sentiment, emotions, and other reactions present in the user's posts and the posts the user is interacting with. Based on the results of post analyzer 310, thread analyzer 320, and user analyzer 330, model constructor 340 constructs a model representing development of social media users' posts and interactions with other user over time.

Once application 300 has constructed the model, post analyzer 310, thread analyzer 320, and user analyzer 330 analyze each new post from social media content 302, and trajectory forecaster 350 computes a likelihood, above a predetermined threshold, that each post represents constructive dialogue and a likely trajectory of future posts in the thread, for each user participating in the thread and for the thread as a whole. For example, trajectory forecaster 350 might rate a post from social media content 302 highly for constructive dialogue, and determine that the post's thread is proceeding constructively and likely to continue in this manner for a particular time period, because the last few posts in the thread have expressed different opinions about the topic but are moving towards a consensus. Trajectory forecaster 350 might rate a different post from social media content 302 as having a lower likelihood of representing constructive dialogue, and determines that this post's thread is at a turning point and may not continue to proceed constructively.

Action generator 360 responds to the output of trajectory forecaster 350 by generating actions. If a trajectory is forecasted to remain positive, action generator 360 generates actions designed to continue the positive interaction, such as by opening the thread to additional contributors, highlighting the thread, allowing the thread to remain open for posting for a longer period of time, or otherwise notifying users that this thread is particularly useful or constructive. However, if the thread turns unconstructive, or has a trajectory indicating a likelihood of turning unconstructive, action generator 360 takes one or more actions to attempt to remedy the situation. For example, if one user is the source of the unconstructive trajectory, action generator 360 warns the user that his or her behavior is unacceptable, then if the behavior continues action generator 360 suspends the user from posting in a thread for a period of time. If the behavior continues action generator 360 suspends the user from posting to the thread for a longer period of time, or suspends the user from related threads for a time period. Ultimately if the behavior continues in one or many threads, action generator 360 permanently bans the user from posting to related topics or from posting on the platform at all. In addition, if a sufficient fraction of the users posting to a thread are contributing to the unconstructive trajectory, action generator 360 prevents all users from posting to thread for a period of time. Action generator 360 may also permanently prevent all users from posting to a thread if the behavior continues after a suspension expires. Action generator 360 also generates template responses for users that are likely to improve the trajectory of the thread.

As well, application 300 includes user interface 370 for configuring features of application 300 and communicating with users.

With respect to FIG. 4, this figure depicts a flowchart of an example process for encouraging constructive social media interactions in accordance with an illustrative embodiment. Process 400 can be implemented in application 300 in FIG. 3.

The application begins in block 402, where the application analyzes social media content to construct a model. Then, using the model, in block 404 the application computes a likelihood that an social post represents constructive dialogue. In block 406 the application uses the model and the computed likelihood to forecast a trajectory of future posts. The trajectory can be computed on a per-user or per-thread basis. In block 408 the application checks whether the forecasted trajectory is positive or negative. If the trajectory is positive ("YES" path of block 408), in block 410 the application applies encouraging measures to prompt users to continue the positive interaction. If the trajectory is negative ("NO" path of block 408), in block 412 the application applies a remedial measure such as suspending an unconstructive user from posting for a time or permanently. In block 414 the application applies another remedial measure, suggesting a positive response to the thread that should alter the negative trajectory. In block 416 the application checks for another social media post. If there is one ("YES" path of block 416), the application returns to block 404. If not ("NO" path of block 416), the application ends.

Thus, a computer implemented method, system or apparatus, and computer program product are provided in the illustrative embodiments for encouraging constructive social media interactions and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
constructing, based on analyzing semantic features of social media content using natural language understanding, a model representing development of a first user's posts and interactions with other users in a thread over time, the constructing further being based on computing a sentiment score for the first user's posts;
computing, using the model, a likelihood that a post of the first user represents constructive dialogue;
forecasting, using the model, the likelihood, and the post, a first trajectory of future posts from the first user;
applying, responsive to forecasting that the first trajectory is a negative trajectory, a remedial action to positively alter the first trajectory of future posts,
forecasting, using the model, the first user's posts in the thread, and posts of the other users in the thread, a second trajectory of the thread as a whole; and
applying, responsive to forecasting that the second trajectory is a positive trajectory, an action to encourage further participation in the thread,
wherein the action comprises prompting at least one of the first user and the other users to continue the thread and increasing an amount of time that the thread is open for posting, wherein the second trajectory of the thread comprises future posts of the first user and future posts reacting to the post.

2. The method of claim 1, further comprising:
applying, responsive to forecasting a positive first trajectory, an action to encourage a second post responding to the post of the first user.

3. The method of claim 1, wherein a remedial action comprises:
preventing the first user from posting on a topic related to the post for a period of time.

4. The method of claim 1, wherein a remedial action comprises:
suggesting a response to the post, the response being likely to positively alter the second trajectory of the thread.

5. The method of claim 1, further comprising:
determining a plurality of topics of the first user's posts based on the analyzing of the semantic features of social media content using natural language understanding; and
computing, for each of the plurality of topics, a respective probability that the first user is open to an interaction on a per-topic basis.

6. A computer usable program product comprising one or more computer-readable storage devices, and program instructions stored on at least one of the one or more storage devices, the stored program instructions comprising:
program instructions to construct, based on analyzing semantic features of social media content using natural language understanding, a model representing development of a first user's posts and interactions with other users in a thread over time the constructing further being based on computing a sentiment score for the first user's posts;
program instructions to compute, using the model, a likelihood that a post of the first user represents constructive dialogue;
program instructions to forecast, using the model, the likelihood, and the post, a first trajectory of future posts from the first user;
program instructions to apply, responsive to forecasting that the first trajectory is a negative trajectory, a remedial action to positively alter the first trajectory of future posts,
program instructions to forecast, using the model, the first user's posts in the thread, and posts of other users in the thread, a second trajectory of the thread as a whole; and
applying, responsive to forecasting that the second trajectory is a positive trajectory, an action to encourage further participation in the thread,
wherein the action comprises prompting at least one of the first user and the other users to continue the thread and increasing an amount of time that the thread is open for posting,
wherein the second trajectory of the thread comprises future posts of the first user and future posts reacting to the post.

7. The computer usable program product of claim 6, further comprising:
program instructions to apply, responsive to forecasting a positive first trajectory, an action to encourage a second post responding to the post of the first user.

8. The computer usable program product of claim 6, wherein a remedial action comprises:
preventing the first user from posting on a topic related to the post for a period of time.

9. The computer usable program product of claim 6, wherein a remedial action comprises:
suggesting a response to the post, the response being likely to positively alter the second trajectory of the thread.

10. The computer usable program product of claim 6, wherein the program instructions are stored in a computer readable storage device in a data processing system, and wherein the program instructions are transferred over a network from a data processing system.

11. The computer usable program product of claim 6, wherein the program instructions are stored in a computer readable storage device in a server data processing system, and wherein the program instructions are downloaded over a network to a data processing system for use in a computer readable storage device associated with the data processing system.

12. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct, based on analyzing semantic features of social media content using natural language understanding, a model representing development of a first user's posts and interactions with other users in a thread over time the constructing further being based on computing a sentiment score for the first user's posts;
program instructions to compute, using the model, a likelihood that a post of the first user represents constructive dialogue;
program instructions to forecast, using the model, the likelihood, and the post, a first trajectory of future posts from the first user;
program instructions to apply, responsive to forecasting that the first trajectory is a negative trajectory, a remedial action to positively alter the first trajectory of future posts,
program instructions to forecast, using the model, the first user's posts in the thread, and posts of other users in the thread, a second trajectory of the thread as a whole; and
applying, responsive to forecasting that the second trajectory is a positive trajectory, an action to encourage further participation in the thread,
wherein the action comprises prompting at least one of the first user and the other users to continue the thread and increasing an amount of time that the thread is open for posting,
wherein the second trajectory of the thread comprises future posts of the first user and future posts reacting to the post.

13. The computer system of claim 12, further comprising:
program instructions to apply, responsive to forecasting a positive first trajectory, an action to encourage a second post responding to the post of the first user.

14. The computer system of claim 12, wherein a remedial action comprises:
preventing the first user from posting on a topic related to the post for a period of time.

15. The computer system of claim 12, wherein a remedial action comprises:

suggesting a response to the post, the response being likely to positively alter the second trajectory of the thread.

\* \* \* \* \*